Oct. 27, 1953     C. W. MAHR     2,656,614
TESTING APPARATUS FOR GEARS
Filed Dec. 13, 1949
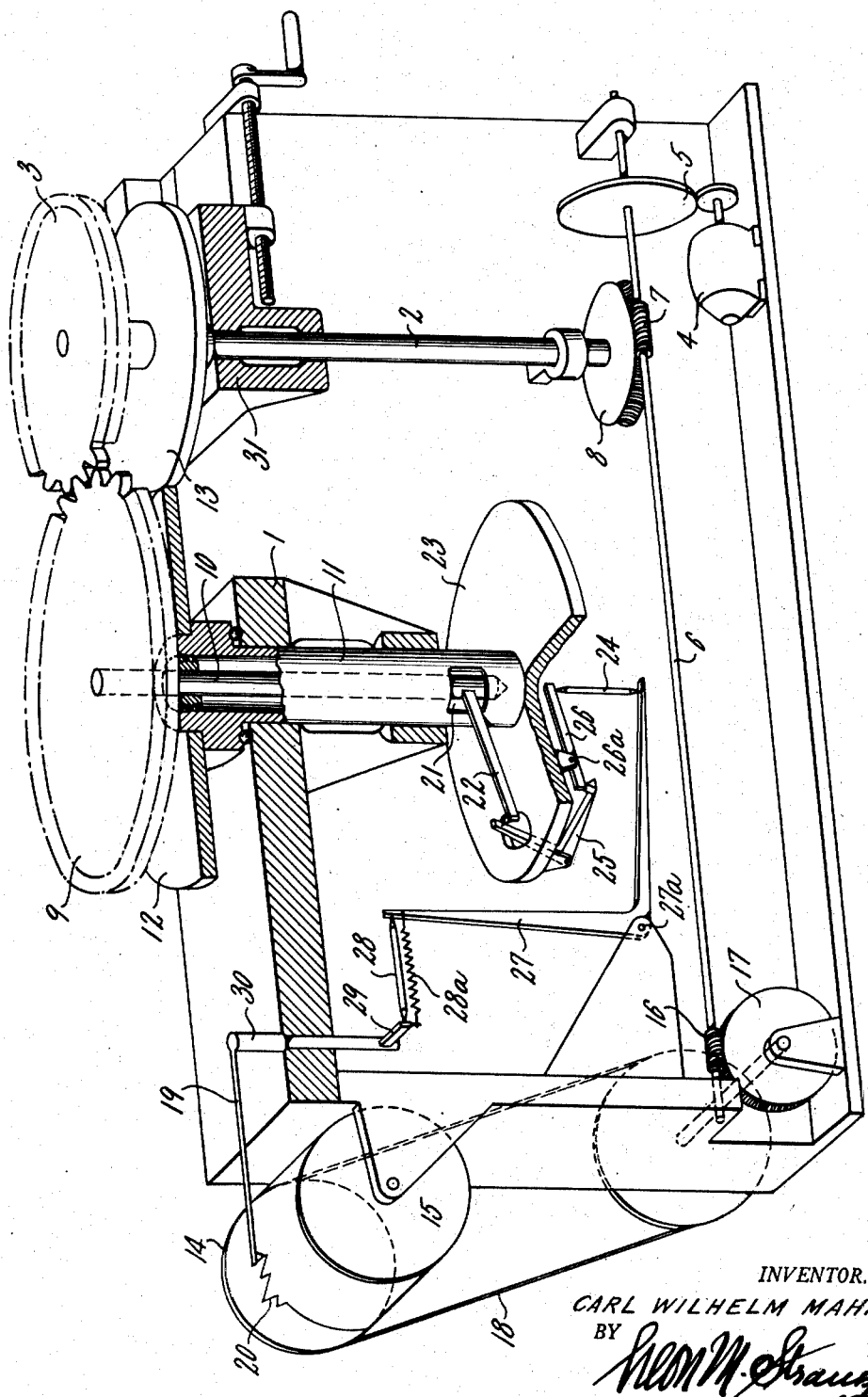
INVENTOR.
CARL WILHELM MAHR Patented Oct. 27, 1953

2,656,614

UNITED STATES PATENT OFFICE 2,656,614

TESTING APPARATUS FOR GEARS

Carl Wilhelm Mahr, Esslingen (Neckar), Germany

Application December 13, 1949, Serial No. 132,662
In Switzerland December 15, 1948

5 Claims. (Cl. 33—179.5)

This invention relates to testing apparatus for gears or similar toothed wheels.

It is one of the fundamental purposes of the invention to provide means detecting errors or inaccuracies in gearings which cause variations in angular velocity while actual operating conditions are maintained as closely as possible when rolling the teeth of the gear to be tested.

It is another purpose of the invention to provide means facilitating transfer of indicated errors simply and accurately to a stationary recording device.

In one well known type of testing apparatus the indicating device rotates with the piece to be tested thus impairing accurate reading and tests. Other types of apparatus avoid this disadvantage of a rotating indicator by transferring the differences of angular velocity through relatively complicated gearing mechanism. To this end, a plurality of transmission elements is employed which elements, however, react unfavorably with respect to the accuracy of error indications. According to still another construction of apparatus, one gear rolls in planetary fashion around a stationary piece to be tested which gear makes only slight angular movements when toothing errors are encountered. This construction does not take into consideration the principle of actual working conditions during the test during which the rotation of one axis about the other axis might produce additional errors.

All these and other deficiencies are successfully avoided according to the present invention which refers to an improved construction of a rolling testing apparatus through which toothing errors are indicated by the difference in angular velocity of two co-axial shafts, one of which being disposed within a hollow shaft. The first mentioned shaft carries the test piece and the other shaft a friction disc, both shafts being driven by a third shaft through the intermediary of a further friction disc, and a calibrated or master gear. The error indicating device is preferably constructed as a recorder which is stationary on the testing apparatus and which permits transmission of the differences in angular velocity arising from toothing errors to the indicator device on which an axially displaceable member is arranged which is influenced from both the aforesaid shafts and said hollow shaft.

According to the invention, by inherently simple means angular velocity differences are transmitted from rotating to stationary parts of the recording instrument and a high degree of precision and accuracy is achieved.

One of the two co-axial shafts serving to determine the differences in angular velocity is connected to a disc or flange while the other carries a lever arranged to extend substantially radially therefrom which lever acts on one end of an axially displaceable rod member through a lever system mounted on the disc. The opposite end of the axial rod member rests on the free extremity of a lever which is carried by the frame of the testing apparatus, this lever acting through a leverage system and rods on the stylus of the recording or indicating device. It is preferred to attach the aforesaid radial lever to the test piece shaft in such manner that it projects through an aperture in the hollow shaft carrying the driven friction disc.

The members of the two rotating and stationary lever systems are positively connected by rods, perferably by the use of cone or centering points. The indicating device consists preferably of a recording drum driven by the mechanism of the testing apparatus on which drum a recording stylus travels, deflecting laterally under the influence of errors in the test-piece.

An embodiment of this invention is illustrated and shown diagrammatically in the accompanying drawing.

With the above and other objects in view, the invention will be hereinafter more fully described and the combination and arrangement of parts will be shown in the accompanying drawing and pointed out in the claims which form part of this specification.

Referring now more particularly to the drawing, there is shown a frame 1 of the testing apparatus in which there is disposed a substantially vertical shaft 2 which carries at its upper end an interchangeable master or calibrated gear 3. Gear 3 is uniformly driven, for instance by an electric motor 4, through transmission wheel 5, horizontal shaft 6 and worm gearing 7, 8.

The test piece 9 which engages the master gear 3 is interchangeably mounted on a second vertical shaft 10. Coaxially with the latter a hollow shaft 11 is disposed which carries a friction disc 12. Friction disc 13 fixed on shaft 2 drives the aforementoned friction disc 12.

In order to test gears of varying diameters to which the master gear 3 corresponds, the interchangeable friction discs 12 and 13 with corresponding diameters are provided. The diameters of these discs are so selected that the hollow shaft 11 is always driven with an angular velocity corresponding to that of the master gear 3. Accordingly, shaft 2 is supported in an adjustable slide 31 and the worm 7 is arranged to slide along shaft 6.

In the embodiment shown, the device which indicates the differences in angular velocity between the two shafts 10 and 11 caused by errors in the test piece 9 is arranged to record these errors. The indicator device consists of a recording drum 14 rotatably supported with its horizontal axis 15 on frame 1 of the test apparatus. Drum 14 is driven from shaft 6 by worm gearing 16, 17 and belt drive 18. A recording stylus is arranged for movement over the surface of drum 14 and is deflected laterally by errors in the test piece. In the case of a perfect gear the recorded marking 20 would appear as a straight line.

Errors in the test piece 9 give rise to differences in angular velocity between rotating shaft 10 of the test piece 9 and the rotating hollow shaft 11. Any of these differences are first sensed by and transmitted from lever 22 to bell-crank 25 and then to lever 26 which is positively connected to a member 24 hereinafter referred to. Of course, during uniform rotation of shafts 10 and 11 (if the relative rotative movement of said shafts becomes zero) no additional movement of the bell-crank 25 takes place.

For transmitting the angular velocity differences from this system of levers rotating with hollow shaft 11 to a lever system on the frame 1 of the test apparatus, an axially displaceable member 24 is disposed to extend in axial alignment with shaft 10 and hollow shaft 11.

In the present embodiment of the invention, the lever system mounted on disc 23 and connected to hollow shaft 11 consists of an angle lever 25, one arm of which projects through an opening in the disc 23 to engage the lever 22 projecting from shaft 10. The other arm of the angle lever 25 acts on one end of a two-armed lever 26 which is pivoted on disc 23 at 26a; the other end of lever 26 rests on the pointed or top end of an axially movable rod member 24 which is aligned with shafts 10, 11. The bottom end of said rod member 24 rests on the free end of angle lever 27 carried by a stationary pivot 27a on frame 1 of the apparatus. The vertical arm of lever 27 actuates a substantially horizontal intermediate rod member 28 which has opposite pointed ends and engages under spring action arm 29 affixed to spindle 30 of the indicating or recording stylus 19.

The members of the co-rotating levers and those stationary on the frame work are positively connected by means of cone or centering ends or points, springs and counterweights which secure a positive transmission of high sensitivity.

The operation of the testing apparatus may now be readily understood. If error or inaccuracy occurs between master gear 3 and test gear 9, shafts 10 and 11 will not rotate with one and the same speed, a difference in angular velocity taking place which will cause movement of shaft 10 relatively to shaft 11, whereby lever 22 will assume another position within slot 21. Lateral shifting or displacement of lever 22 is transmitted through leverage 25—26 to rod member 24 which is then displaced in upward or downward direction (as the case may be), but always in axial direction to shaft 10.

Due to action of spring 28a lever 27 will follow these displacements of rod member 24 and will translate them to spindle 30 and stylus 19 for recording purposes on drum 20.

It can thus be seen that there has been provided in accordance with this invention a test apparatus for gears and like elements comprising two co-axially arranged shafts, a test gear mounted on one of said shafts, a friction disc on the other of said shafts, a third shaft including means in driving connection with said friction disc and said test gear, respectively, a frame for supporting said shafts, a recording device mounted on said frame, and a stylus adapted to contact said recording device and including a lever system operatively connected to said one shaft and thence to said other shaft and adapted to transmit the difference of angular velocity between said co-axial shafts, said lever system including a member displaceable in axial direction of said co-axial shafts.

Although the invention has been described with reference to a certain specific embodiment thereof, it is to be distinctly understood that various modifications and adaptations of the arrangements herein disclosed may be made as may readily occur to persons skilled in the art without constituting a departure from the spirit and scope of the invention as defined in the objects and in the appended claims.

Having thus described the invention, what is claimed as new and desired to be secured by Letters Patent, is:

1. A testing apparatus for gears and like toothed elements, comprising a first shaft, a second and hollow shaft surrounding said first shaft and co-axially arranged thereto, a test gear fixedly mounted on said first shaft, a friction disc fixed to said hollow shaft, a third shaft including respective means in driving connection with said friction disc and said test gear, a frame supporting all said shafts, a recording device mounted on said frame and located remote from said shafts, a stylus adapted to contact said recording device, a lever system establishing operative connection between said first shaft and said stylus, said lever system including a radial lever passing through an enlarged opening of said second and hollow shaft to permit relative displacement thereto, and a bell-crank supported by said second shaft and adapted to transmit rotational differences of angular velocity between said co-axial shafts to said stylus, said lever system including a member aligned with and displaceable in axial direction of said co-axial shafts upon movements of said bell-crank transmitted from said radial lever to said member.

2. A testing apparatus for gears and like toothed elements, comprising two co-axially arranged shafts, first and second shafts, respectively, said first shaft being rotatably mounted within said second shaft, a test gear fixedly mounted on said first shaft, a friction disc fixed to said second shaft, a third shaft, a friction disc fixed to said third shaft and in driving connection with said friction disc of said second shaft, a master gear attached to said third shaft and in mesh with said test gear, a frame, a recording device including a drum mounted on said frame, a stylus resting on said drum of said recording device and including a lever system operatively connected to said first shaft and adapted to transmit differences in angular velocity between said co-axial shafts, said lever system including a member displaceable in axial direction of and axially aligned with said co-axial shafts, a disc-shaped support on said second shaft and provided with an opening, a radial lever extending from said first shaft and through an aperture of said second shaft, said aperture permitting relative motion of said radial lever and said second shaft, a lever arm passing through said opening of said support and pivoted thereon for actuation by said radial lever and transmission of the movement of the latter to said axially aligned member and thence to said stylus upon movement of said first shaft relatively to said second shaft, said lever arm forming part of said lever system, and means adapted to drive said third shaft and thence said master gear and said friction wheel of said third shaft.

3. A testing apparatus according to claim 2, in which the displaceable member projects beyond and in axial alignment with said first and said second shaft.

4. A testing apparatus according to claim 2, in which the recording drum is driven by said latter means.

5. A testing apparatus according to claim 2, in which said axially aligned member is provided with opposite pointed ends abutting against adjacent levers of said lever system.

CARL WILHELM MAHR.

References Cited in the file of this patent

UNITED STATES PATENTS

| Number | Name | Date |
| --- | --- | --- |
| Re. 15,013 | Sauer | Dec. 21, 1920 |
| 1,282,348 | Wirrer | Oct. 22, 1918 |
| 1,505,515 | Wirrer | Aug. 19, 1924 |
| 2,539,239 | Ernst | Jan. 23, 1951 |
| 2,585,528 | Aeppli | Feb. 12, 1952 |

FOREIGN PATENTS

| Number | Country | Date |
| --- | --- | --- |
| 444,209 | England | Mar. 17, 1936 |
| 600,670 | England | Apr. 15, 1948 |